() United States Patent  
Song et al.

(10) Patent No.: US 9,596,296 B2  
(45) Date of Patent: Mar. 14, 2017

(54) METHOD OF INTER-BOARD COMMUNICATION IN A ROUTER CLUSTER, ROUTER, AND ROUTER CLUSTER

(71) Applicant: Huawei Technologies Co., Ltd., Shenzhen, Guangdong (CN)

(72) Inventors: Xuefei Song, Shenzhen (CN); Yinben Xia, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 442 days.

(21) Appl. No.: 14/184,363

(22) Filed: Feb. 19, 2014

(65) Prior Publication Data

US 2014/0172949 A1 Jun. 19, 2014

Related U.S. Application Data

(63) Continuation of application No. PCT/CN2011/078626, filed on Aug. 19, 2011.

(51) Int. Cl.
*G06F 15/16* (2006.01)
*H04L 29/08* (2006.01)
(Continued)

(52) U.S. Cl.
CPC .............. *H04L 67/10* (2013.01); *H04L 29/12* (2013.01); *H04L 45/46* (2013.01)

(58) Field of Classification Search
CPC ......... H04L 29/08; H04L 67/10; H04L 45/46; H04L 29/12
See application file for complete search history.

(56) References Cited

U.S. PATENT DOCUMENTS 7,518,986 B1 4/2009 Chadalavada et al.
7,552,262 B1 6/2009 Turner et al.
(Continued)

FOREIGN PATENT DOCUMENTS

CN 1615610 A 5/2005
CN 1747453 A 3/2006
(Continued)

OTHER PUBLICATIONS

Guo et al., "The Trend of Cluster Based Router Technology," Modern Science & Technology of Telecommunications (Apr. 2010).

*Primary Examiner* — Benjamin M Thieu
(74) *Attorney, Agent, or Firm* — Leydig, Voit & Mayer, Ltd.

(57) ABSTRACT

A method of inter-board communication in a router cluster, a router, and a router cluster are provided. The method comprises: the main router configuring and enabling an IP address of the interconnection interface of the main router, and acquiring IP address(es) of other router(s) in the router cluster; other router(s) except the main router configuring and enabling IP address(es) of interconnection interface(s) of other router(s) except the main router respectively, and acquiring the IP address of the main router; the main router establishing communication connections with other router(s) in the router cluster, and enabling the function of communication agent; the main router and the other router(s) in the router cluster transmitting internal control messages of the router cluster through their respective communication agent modules.

18 Claims, 3 Drawing Sheets

(51) Int. Cl.
*H04L 29/12* (2006.01)
*H04L 12/715* (2013.01)

(56) References Cited

U.S. PATENT DOCUMENTS

| | | | |
|---|---|---|---|
| 2002/0165964 A1* | 11/2002 | Chen | H04L 12/1886 709/226 |
| 2005/0102384 A1 | 5/2005 | Ueno et al. | |
| 2010/0118867 A1 | 5/2010 | Zang et al. | |
| 2010/0149996 A1* | 6/2010 | Sun | H04L 29/12292 370/244 |
| 2010/0287266 A1 | 11/2010 | Asati et al. | |

FOREIGN PATENT DOCUMENTS

| | | |
|---|---|---|
| CN | 1773959 A | 5/2006 |
| CN | 101355430 A | 1/2009 |
| CN | 101394309 A | 3/2009 |
| WO | WO 9820724 A2 | 5/1998 |

* cited by examiner

METHOD OF INTER-BOARD COMMUNICATION IN A ROUTER CLUSTER, ROUTER, AND ROUTER CLUSTER

CROSS-REFERENCE TO RELATED APPLICATIONS

This application is a continuation of International Patent Application No. PCT/CN2011/078626, filed on Aug. 19, 2011. The afore-mentioned patent application is hereby incorporated by reference in its entirety.

TECHNICAL FIELD

The present invention relates to the field of communication technology, and more specifically, to a method of inter-board communication in a router cluster, a corresponding router, and a router cluster.

DESCRIPTION OF THE RELATED ART

A frame routing device is commonly composed of a main control board and several interface boards, both of which are boards in the routing device. The main control board is in charge of controlling and managing other boards in the frame, and thus inter-board communication is an essential function in a routing device, in which all boards are connected to a high speed Ethernet network through a backplane, so as to realize physical communication paths for inter-board communication. Through the function of inter-board communication, the main control board sends configuring information, forwarding table, etc to interface boards, and receiving condition information from the interface boards at the same time. At the software level, each board is assigned with a board number (also called as slot number), if the main control board wants to send data to an interface board, it is enough to merely provide the board number of the destined interface board, data can be sent to the destined board through the Ethernet network described above by software.

With the rapid development of IP networks, IP network carrying capacity and the number of users are continuously increasing, and there is a higher and higher requirement for network bandwidth. In order to respond to the rapidly increased requirement for network bandwidth, in addition to improving the capacities of individual devices, the router cluster technology is one of effective methods for addressing the network bandwidth requirement.

The so-called router cluster is to interconnect a plurality of physically independent routers to form a logically integral router system, in which all routers are centrally managed, and are operated and maintained as a single one when observed outside the system, greatly simplifying device operation and maintenance.

Router clusters in the prior art mostly employ a manner shown in FIG. 1, in which a central switching frame is additionally provided to interconnect a plurality of physically independent routes in a star topology, the main control board of the router cluster is also located on a board of the central switching frame. It can be seen that it is necessary to additionally provide a central switching frame when constructing a router cluster in the prior art, while it is also needed for each router to be provided with additional ports for interconnecting with the central switching frame.

SUMMARY OF THE INVENTION

In view of this, a method of inter-board communication in a router cluster, a router, and a router cluster are provided, which do not need to be additionally provided with a central switching frame in the router cluster.

In order to achieve the above objects, one embodiment of this invention provides a method of inter-board communication in a router cluster, the router cluster comprising a plurality of routers, boards of each of the routers are classified as main control board and interface board, an interconnection interface for interconnecting with other router(s) of the router cluster being provided for each of the routers, a communication agent module being provided on a board on which the interconnection interface is provided, and one router of the router cluster being deployed as a main router in advance;

the method comprising:

configuring and enabling by the main router, an interconnection interface and an IP address, and acquiring IP address(es) of other router(s) in the router cluster;

configuring and enabling, by other router(s) except the main router, interconnection interface(s) and IP address(es) thereof respectively, and acquiring the IP address of the main router;

the main router establishing communication connections with other router(s) in the router cluster, and enabling their communication agent functions;

the main router and the other router(s) in the router cluster transmitting control messages in the router cluster through respective communication agent modules.

On another aspect, this invention provides a router, which is located in a router cluster and deployed as a main router, boards of the router are classified as main control board and interface board, an interconnection interface for interconnecting with other router(s) in the router cluster being provided on a board of the router, a communication agent module being provided on the board on which the interconnection interface is provided, the communication agent module being used to transmit control messages in the virtual cluster, the router further comprising: a first configuration module for configuring and enabling the interconnection interface and an IP address; and a secondary router IP address acquiring module for acquiring IP address(es) of other router(s) in the router cluster.

On a still another aspect, this invention provides a router, which is located in a router cluster and deployed as a secondary router, boards of the router are classified as main control board and interface board, an interconnection interface for interconnecting with other router(s) in the router cluster being provided on a board of the router, a communication agent module being provided on the board on which the interconnection interface is provided, the communication agent module being used to transmit control messages in the virtual cluster, the router further comprising: a second configuration module for configuring and enabling the interconnection interface and an IP address; and a main router IP address acquiring module for acquiring an IP address of a main router in the router cluster.

On a still another aspect, this invention provides a router cluster, comprising a plurality of routers, wherein a router is deployed as a main router, and other router(s) is/are deployed as secondary router(s); each router comprising a main control board and an interface board, an interconnection interface for interconnecting with other router(s) in the router cluster being provided on a board of each router, a communication agent module being provided on the board on which the interconnection interface is provided, the communication agent module being used to transmit control messages in the virtual cluster, wherein the router deployed as the main router further comprises:

a first configuration module for configuring and enabling an interconnection interface and an IP address of the main router; and a secondary router IP address acquiring module for acquiring IP address(es) of other router(s) in the router cluster;

a router deployed as a secondary router further comprises:

a second configuration module for configuring and enabling an interconnection interface and an IP address of the secondary router; and a main router IP address acquiring module for acquiring the IP address of the main router in the router cluster.

According to the embodiments of this invention, without the need of additionally providing a central switching frame in the router cluster to manage various routers, instead, a router in the router cluster functions as a main router, all boards in the router cluster are managed by a main control board of the main router, various control messages are forwarded through a communication agent module on an interface board of each router, the whole cluster has a simpler architecture and lower cost.

DETAILED DESCRIPTION OF THE PREFERRED EMBODIMENT

For a better clarity of objects, technical solutions, and advantages of the embodiments of this invention, a clear description of technical solutions of embodiments of this invention will be given in connection with accompanying drawings of those embodiments. Obviously, embodiments described herein are merely some embodiments of this invention, but not all of them. Based on those embodiments of this invention, other embodiments can occur to those skilled in the art without any creative efforts, all of which fall within the scope of this invention.

Figure 1:
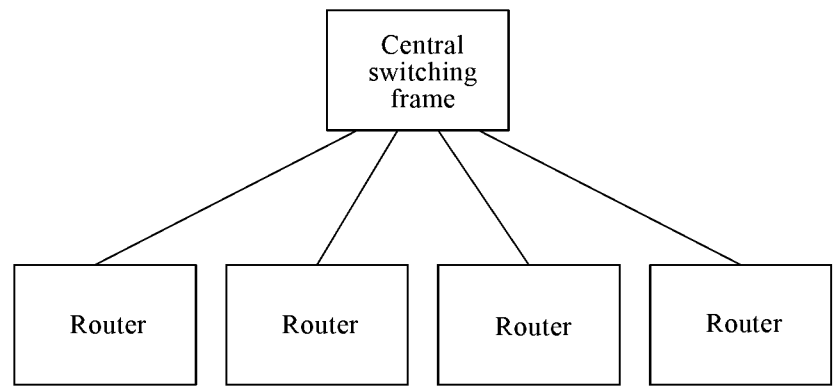
FIG. 1 is a schematic diagram of a scheme of realizing a router cluster in the prior art.
Figure 2:
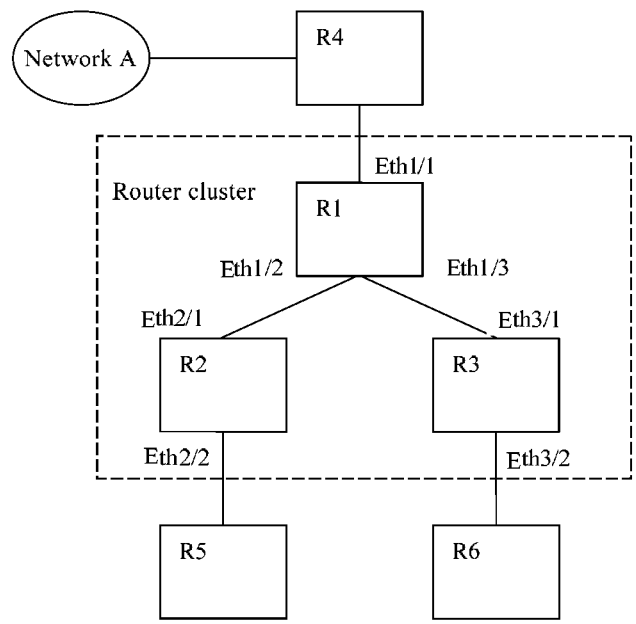
FIG. 2 is a schematic diagram of the architecture of a router cluster of an embodiment of this invention.

In the embodiments of this invention, without the need of additionally providing a central switching frame in a router cluster, it is only needed to select routers to be added into the cluster, and assign a certain router thereof as a main router of the cluster, and all boards in the cluster are centrally managed by a main control board of the main router. FIG. 2 shows a schematic architectural diagram of a router cluster of an embodiment of this invention, as shown in FIG. 2, a topological structure is formed by routers R1-R6 originally present in a network. Suppose routers R1, R2, R3 are added into a router cluster, and the router R1 is assigned as a main router to manage the cluster. An interface in each router for interconnecting with other router(s) in the cluster is called as an interconnection interface, and a board on which the interconnection interface is located may be called as an interconnection board. In FIG. 2, Eth1/2, Eth1/3, Eth2/1, and Eth3/1 are all interconnection interfaces.

Embodiment 1

Based on the above idea, a method of inter-board communication in a router cluster is provided in this embodiment of the present invention, wherein the router cluster comprises a plurality of routers, boards of each of the routers are classified as main control board and interface board, each router having an interconnection interface for interconnecting with other router(s) in the router cluster, the interconnection interface being provided on a board of a router, a communication agent module being provided on the board on which the interconnection interface is provided, and a router in the router cluster being deployed as a main router.

Figure 3:
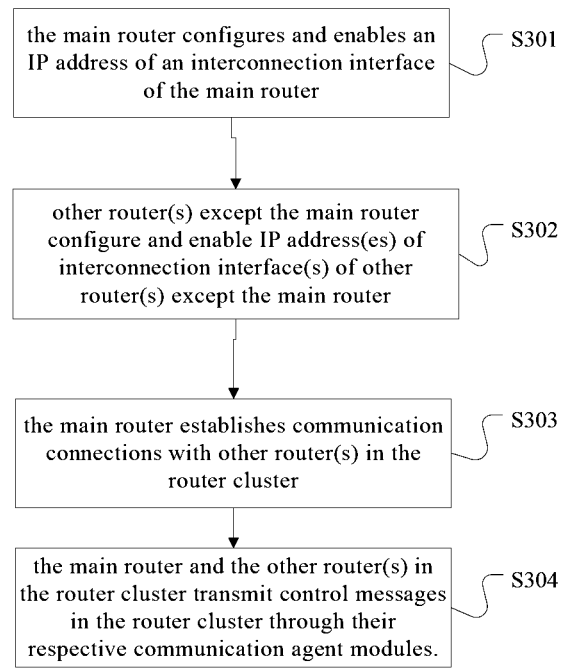
FIG. 3 is a schematic diagram of a method of inter-board communication in the router cluster provided in the embodiment of this invention.

As shown in FIG. 3, the method comprises the following steps.

At step S301, the main router configures and enables an IP address of an interconnection interface of the main router, and acquires IP address(es) of interconnection interface(s) of other router(s).

The main router may configure and enable an IP address of an interconnection interface of the main router according to contents of a command line inputted by a user, certainly, of course, the IP address of the interconnection interface of the main router also can be configured and enabled through accessing contents of a pre-stored configuration file.

Taking the manner of a configuration command as an example, it can be known from above, it is necessary to specify an interconnection interface for a secondary router to interconnect with other router(s), and configure an IP address, at the same time, it is also necessary to specify the IP address of the interconnection interface of the main router to secondary router(s). One particular implementation of a configuration command of a secondary router is as follows:

| | |
|---|---|
| interface Ethernet1/1/0/0 | /*this line is used to enter an interface configuration mode */ |
| vne internal | /*this line is used to specify that this interface is an interconnection interface for routers in the cluster*/ |
| ip address 10.1.1.1 24 | /* this line is used to configure an IP address for this interconnection interface */ |
| undo shutdown | /* this line is used to enable this interface */ |
| quit | /* this line is used to exit the interface configuration mode */ |
| vne master-node 10.1.1.1 | /* this line is used to specify an IP address of an interconnection interface of the main router */. |

When the manner of a configuration file is employed, contents of the configuration file are the same as the information in the above configuration command, while the information of the configuration command is represented in the form of a configuration file.

At step S302, other router(s) except the main router configure and enable IP address(es) of interconnection interface(s) of other router(s) except the main router respectively, and acquire the IP address of the interconnection interface of the main router.

Similarly, other router(s) except the main router also may configure and enable the IP address of the interconnection interface of the main router according to the contents of a command line inputted by a user, certainly, and of course the IP address(es) of the interconnection interface(s) of the other router(s) except the main router also may be configured and enabled through accessing contents of a pre-stored configuration file.

At step S303, the main router establishes communication connections with other router(s) in the router cluster.

At step S304, the main router and other router(s) in the router cluster transmit control messages in the router cluster through their respective communication agent modules.

Figure 4:
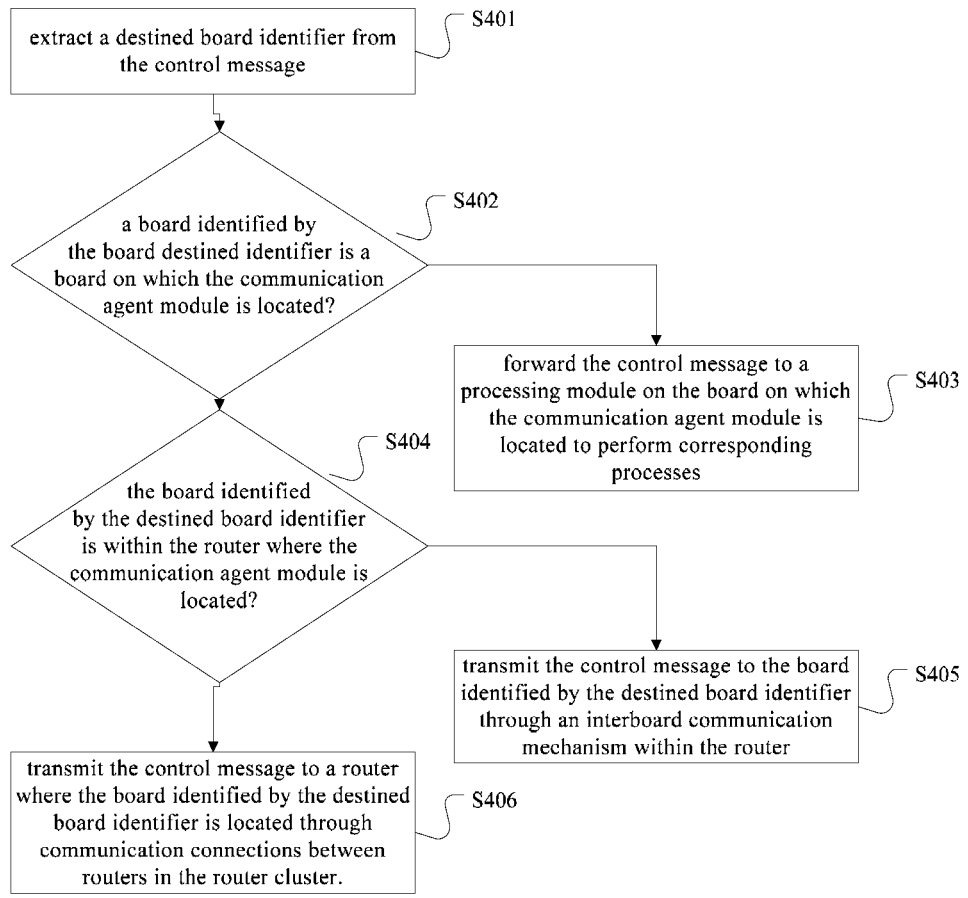
FIG. 4 is a schematic diagram of a particular processing flow of a communication agent module.

Particularly, the processing flow of a communication agent module may be that shown in FIG. 4.

At step S401, a communication agent module that has received a control message extracts a destined board identifier from the message, herein the destined board identifier is a control message.

At step S402, it is determined that whether a board identified by the destined board identifier is a board on which the communication agent module is located, if so, a step S403 is executed, in which the control message is forwarded to a processing module on the board on which the communication agent module is located to perform corresponding processes; otherwise, if the determining result is No, the flow proceeds with a step S404.

At step S404, it is determined whether the board identified by the destined board identifier is within a router where the communication agent module is located. When the determining result of step S404 is Yes, it means that although the control message will not be forwarded to the board where the communication agent module is located, it will be forwarded to another board in the router where the communication agent module is located, and thus a step S405 is executed, in which the control message is transmitted to the board identified by the destined board identifier through an inter-board communication mechanism within the router, herein, the inter-board communication mechanism within the router may be an existing internal communication mechanism of routers in the prior art.

When the determining result of step S405 is No, it means that the control message will be transmitted to neither the board where the communication agent module is located nor another board in the router where the communication agent module is located, but will be transmitted to a certain board in another router, and thus a step S406 is executed, in which the control message is transmitted to a router where the board identified by the destined board identifier is located through communication connections between routers in the router cluster.

Thus, it is realized to forward the control message to its destination.

The destined board identifier in various steps above may be the board number of a destined board, that is, the board number of a board to which the control message will be transmitted.

It can be seen that the technical solution provided in the embodiment of this invention does not need to additionally provide a central switching frame in a router cluster to manage each router, instead, a router in the router cluster may function as a main router, a main control board of the main router is used to manage all boards in the router cluster, various control messages are forwarded through a communication agent module on an interface board of each router, the whole cluster has a simpler architecture and lower cost.

In a further preferable implementation, before step S401, the communication agent module determines whether the received message is a control message or a data packet. If it is a data packet, it is processed directly through a data packet forwarding process. If it is a control message, the flow proceeds with a step S401. Therefore, it can be realized to share the same interface and link by control messages and data packets, after the construction of a topology for data packets in the router cluster, the topology for control messages is naturally determined, without the need for additional devices and network construction. Further, it enables routers in a router cluster to interconnect with each other through regular data interfaces, breaking the limit of having to employ a star topology in the prior art, in addition, without the requirement of having to employ Ethernet connections between the routers in the router cluster anymore (a Ethernet connection between two nodes is commonly within a distance of 100 m), thus the routers in the router cluster can be separated by a longer distance, and a more flexible topology construction in the cluster is also possible.

Below, a particular example will be given to detail a forwarding flow of the communication agent module. Taking FIG. 2 as an example again, it is assumed that boards 1-10 are located in a router R1, boards 11-20 are located in a router R2, and boards 21-30 are located in a router R3, a board 5 in the router R1 is deployed as an interface board, that is, a communication agent module is provided on the board 5, and a board 12 in the router R2 is deployed as an interface board, that is, a communication agent module is provided on the board 12.

Now, it is needed to transmit a control message from a board 4 in the router R1 to a board 14 in the router R2. Because a transmitter and a receiver of the control message are not located in the same router, a communication between routers needs to be implemented. In practice, in one implementation, a layer 3 message is transmitted by the board 4 to the interface board of the router R2 (i.e., board 12), and the control message is finally transmitted to a destined board (i.e., the board 14) through a determining of the communication agent module on the board 12. Note that in a practical physical link, it is still necessary to forward the control message to the board 12 in the router R2 through the board 5 in the router R1. However, due to the above transmission mechanism employed for the control message, the process does not reach the layer 4 of the network, i.e., a layer on which the communication agent module operates, the communication agent function in the router R1 does not know that the control message passes through the board 5. From the perspective of software, it seems as if the control message was directly transmitted from the board 4 to the board 12.

In another implementation, a message is first transmitted from the board 4 to a interface board (i.e., board 5) of the router R1 at the layer 2 of the network, then the control message is forwarded by the board 5 to the interface board (i.e., board 12) of the router R2 where the destined board is located, and then is forwarded by board 12 to the destined board (i.e., board 14) through an inter-board communication mechanism within the router.

Embodiment 2

This embodiment of the present invention further provides a router accordingly, which is located in a router cluster and is deployed as a main router, boards of the router being classified as main board and interface board, the main board of the router being used to manage boards of all routers in the router cluster. The router of this embodiment has an interconnection interface provided on a board for interconnecting with other router(s) in the router cluster, and a board of the router on which an interconnection interface is provided may be called as an interconnection board. A communication agent module is provided on the board where the interconnection interface is located, which is used to transmit control messages in the virtual cluster.

Further, the router described above that is deployed as a main router may further comprise a first configuration module and a secondary router IP address acquiring module. Wherein, the first configuration module is used to configure and enable an IP address of the interconnection interface of the router itself (i.e., the main router). The secondary router IP address acquiring module is used to acquire IP address(es) of interconnection interface(es) of other router(s) (i.e., a secondary router) in the router cluster.

According to a particular operation flow of the communication agent module, the communication agent module may comprise a destined board identifier extracting unit, a first determining unit, and an intra-board forwarding module.

Wherein, the destined board identifier extracting unit is used to extract from a received control message a destined board identifier, the destined board identifier described above is a board identifier of a board to which the control message is to be transmitted.

The first determining unit is used to determining whether the board identified by the extracted destined board identifier is the board where the communication agent module itself is located.

The intra-board forwarding module is used to when the determining result of the first determining unit is Yes, transmit the control message described above to a processing module on the board where communication agent module itself is located for processing.

In a further preferable implementation, the communication agent module further comprises a second determining unit and an intra-router forwarding module.

Wherein, the second determining unit is used to when the determining result of the first determining unit is No, determine whether the board identified by the destined board identifier of the control message is within a router where the communication agent module itself is located.

The intra-router forwarding module is used to when the determining result of the second determining unit is Yes, transmit the control message described above to the board identified by the destined board identifier through an inter-board communication mechanism within the router.

Further, preferably, the communication agent module may further comprise an inter-router forwarding module, which is used to when the determining result of the second determining unit is No, transmit the control message to the router where the board identified by the destined board identifier is located through communication connections between routers in the router cluster.

Further, the communication agent module may further comprise a message type determining unit, which is used to after a message has been received by the communication agent module, first, recognize the type of the message, and then trigger the destined board identifier extracting unit for subsequent operations if a control message is recognized, and trigger a data packet transmitting flow if a data packet is recognized. Therefore, it can be realized to share the same interface and link by control messages and data packets, after the topology construction of data packets in the router cluster, the topology for control messages is naturally determined, without the need for additional devices and network construction. Further, routers in a router cluster are enabled to interconnect with each other through regular data interfaces, breaking the limit of having to employ a star topology in the prior art, in addition, without the requirement of having to employ Ethernet connections between the routers in the router cluster anymore (a Ethernet connection between two nodes is commonly within a distance of 100 m), thus the routers in the router cluster can be separated by a longer distance, and a more flexible topology construction in the cluster is also possible.

Embodiment 3

This embodiment of the present invention further provides a router accordingly, which is located in a router cluster and is deployed as a secondary router. Boards of the secondary router are classified as main board and interface board. It should be noted that although the secondary router of this embodiment also comprises a main control board, the main control board is unable to control other router(s) in the router cluster. The reason why the boards of the secondary router are classified as main control board and interface board is that the router in this embodiment can employ an existing frame routing device, without the need of updating of devices. In an existing frame routing device, it is necessary to provide a main control board for each router to control other boards (i.e., interface boards) in the router.

The secondary router of this embodiment has an interconnection interface provided on a board for interconnecting with other router(s) in the router cluster. The board where the interconnection interface is located is provided with a communication agent module, which is used to transmit control messages in the virtual cluster.

Further, the secondary router may further comprise a second configuration module and a main router IP address acquiring module.

The second configuration module is used to configure and enable an IP address of the interconnection interface of the router itself. The main router IP address acquiring module is used to acquire an IP address of an interconnection interface of a main router in the router cluster.

According to a particular operation flow of the communication agent module, the communication agent module may comprise a destined board identifier extracting unit, a third determining unit, and an intra-board forwarding module.

Wherein the destined board identifier extracting unit is used to extract from a received control message a destined board identifier, the destined board identifier described above is a board identifier of a board to which the control message is to be transmitted. The third determining unit is used to determining whether the board identified by the extracted destined board identifier is the board where the communication agent module itself is located. The intra-board forwarding module is used to when the determining result of the third determining unit is Yes, transmit the control message described above to a processing module on the board where communication agent module itself is located for processing.

In a further preferable implementation, the communication agent module further comprises a fourth determining unit and an intra-router forwarding module.

Wherein, the fourth determining unit is used to when the determining result of the third determining unit is No, determining whether the board identified by the destined board identifier of the control message is within the router where the communication agent module itself is located. The intra-router forwarding module is used to when the determining result of the fourth determining unit is Yes, transmit the control message described above to a board identified by the destined board identifier through an inter-board communication mechanism within the router.

Further, preferably, the communication agent module may further comprise an inter-router forwarding module, which is used to when the determining result of the fourth determining unit is No, transmit the control message to a router where a board identified by the destined board identifier is located through communication connections between routers in the router cluster.

Further, the communication agent module may further comprise a message type determining unit, which is used to after a message has been received by the communication agent module, first, recognize the type of the message, and then trigger the destined board identifier extracting unit for subsequent operations if a control message is recognized, and trigger a data packet transmitting flow if a datagram is recognized. Therefore, it can be realized to share the same interface and link by control messages and data packets, after the topology construction of data packets in the router cluster, the topology for control messages is naturally determined, without the need for additional devices and network construction. Further, routers in a router cluster are enabled to interconnect with each other through regular data interfaces, breaking the limit of having to employ a star topology in the prior art, in addition, without the requirement of having to employ Ethernet connections between the routers in the router cluster anymore (a Ethernet connection between two nodes is commonly within a distance of 100 m), thus the routers in the router cluster can be separated by a longer distance, and a more flexible topology construction in the cluster is also possible.

Embodiment 4

This embodiment of the present invention further provide a router cluster accordingly, which comprises a plurality of routers, wherein a router is deployed as a main router, other router(s) is/are deployed as secondary router(s), and wherein the main router may employ a main router provided in Embodiment 2, and the secondary router(s) may employ a secondary router provided in Embodiment 3, which will not be described in detail herein.

The disclosure above is merely some particular embodiments of this invention, and this invention will not be limited thereto, any modifications that can be conceived by those skilled in the art are all within the scope of this invention.

What is claimed is:

1. A method of inter-board communication in a router cluster, wherein one router of the router cluster is a main router, the method comprising:
    configuring and enabling, by the main router, an IP address of an interconnection interface of the main router, and acquiring one or more IP addresses corresponding to one or more interconnection interfaces of one or more other routers in the router cluster, respectively, wherein boards of each router in the router cluster are classified as a main control board and an interface board, wherein the router cluster comprises a plurality of physically independent routers, the plurality of physically independent routers are centrally managed, the plurality of physically independent routers are operated as a single router, each router in the router cluster includes an interconnection interface for interconnecting with routers in the router cluster, the interconnection interface being provided on a board, and a communication agent module being provided on the board on which the interconnection interface is provided;
    configuring and enabling, by one or more other routers besides the main router, one or more IP addresses of one or more interconnection interfaces of the one or more other routers besides the main router and acquiring the IP address of the interconnection interface of the main router; and
    establishing, by the main router, one or more communication connections with one or more other routers in the router cluster and transmitting, by the main router and one or more other routers in the router cluster, control messages in the router cluster through communication agent modules of the main router and the one or more other routers.

2. The method according to claim 1, wherein the transmitting, by the main router and the one or more other routers in the router cluster, control messages in the router cluster through communication agent modules of the main router and the one or more routers comprises:
    extracting, by a first communication agent module that has received a control message, a destined board identifier from the control message, wherein the destined board identifier is an identifier of a board to which the control message is to be transmitted; and
    if the board identified by the destined board identifier is board on which the first communication agent module is located, then forwarding the control message to a processing module on the board on which the first communication agent module is located for processing.

3. The method according to claim 2, wherein the transmitting, by the main router and the one or more other routers in the router cluster, control messages in the router cluster through communication agent modules of the main router and the one or more other routers further comprises:
    if the board identified by the destined board identifier is not the board on which the first communication agent module is located, then determining whether the board identified by the destined board identifier is within the router on which the first communication agent module is located, and if a result of the determining is Yes, transmitting the control message to the board identified by the destined board identifier through an inter-board communication mechanism within the router.

4. The method according to claim 3, wherein the transmitting, by the main router and the one or more other routers in the router cluster, control messages in the router cluster through communication agent modules of the main router and the one or more other routers further comprises:
    if the board identified by the destined board identifier is not within the router on which the first communication agent module is located, then transmitting the control message to a router on which the board identified by the destined board identifier is located through communication connections between routers of the router cluster.

5. The method according to claim 1, wherein the configuring and enabling, by the main router, the IP address of the interconnection interface of the main router comprises:
    configuring and enabling, by the main router, the IP address of the interconnection interface of the main router according to contents of a command line inputted by a user.

6. The method according to claim 1, wherein the configuring and enabling, by the main router, the IP address of the interconnection interface of the main router comprises:
    accessing, by the main router, contents of a pre-stored configuration file, and
    configuring and enabling, by the main router, the IP address of the interconnection interface of the main router according to the contents of the pre-stored configuration file.

7. A router located in a router cluster and deployed as a main router, the router comprising:
    boards of the router classified as a main control board and at least one interface board, wherein a first interface board of the at least one interface boards is used to transmit control messages in the router cluster, and wherein the router cluster comprises a plurality of physically independent routers, the plurality of physically independent routers are centrally managed, the plurality of physically independent routers are operated as a single router;

an interconnection interface provided on one of the main control board and the at least one interface board for interconnecting with one or more other routers in the router cluster; and a processor configured to configure and enable an IP address of the interconnection interface of the router, and acquire one or more IP addresses of one or more interconnection interfaces corresponding to the one or more other routers, respectively, in the router cluster.

8. The router according to claim 7, wherein the first interface board is further configured to:

extract a destined board identifier from a control message, wherein the destined board identifier is a board identifier of a board to which the control message is to be transmitted;

determine whether the board identified by the extracted destined board identifier is the first interface board; and in response to determining that the board identified by the extracted destined board identifier is the first interface board, transmit the control message to a processing module on the first interface board for processing.

9. The router according to claim 8, wherein the first interface board is further configured to:

in response to determining that the board identified by the extracted destined board identifier is not the first interface board, determine whether the board identified by the destined board identifier of the control message is within the router on which the first interface board is located; and in response to determining that the board identified by the destined board identifier of the control message is within the router on which the first interface board is located, transmit the control message to the board identified by the destined board identifier through an inter-board communication mechanism within the router.

10. The router according to claim 9, wherein the first interface board is further configured to:

in response to determining that the board identified by the destined board identifier of the control message is not within the router on which the first interface board is located, transmit the control message to a router where the board identified by the destined board identifier is located through communication connections between routers in the router cluster.

11. A router located in a router cluster and deployed as a secondary router, the router comprising:

boards that are classified as a main control board and at least one interface board, wherein a first interface board of the at least one interface boards is used to transmit control messages in the router cluster, and wherein the router cluster comprises a plurality of physically independent routers, the plurality of physically independent routers are centrally managed, the plurality of physically independent routers are operated as a single router;

an interconnection interface provided on one of the main control board and the at least one interface board for interconnecting with one or more other routers in the router cluster;

a processor configured to:
configure and enable an IP address of the interconnection interface of the router, and acquire an IP address of an interconnection interface of a main router in the router cluster.

12. The router according to claim 11, wherein the first interface board is further configured to:

extract a destined board identifier from a control message, wherein the destined board identifier is the board identifier of a board to which the control message is to be transmitted;

determine whether the board identified by the extracted destined board identifier is the first interface board; and in response to determining that the board identified by the extracted destined board identifier is the first interface board, transmit the control message to a processing module on the first interface board for processing.

13. The router according to claim 12, wherein the first interface board is further configure to:

in response to determining that the board identified by the extracted destined board identifier is not the first interface board, determine whether the board identified by the destined board identifier of the control message is within the router on which the first interface board is located; and in response to determining that the board identified by the destined board identifier of the control message is within the router on which the first interface board is located, transmit the control message to the board identified by the destined board identifier through an inter-board communication mechanism within the router.

14. The router according to claim 13, wherein the first interface board is further configured to:

in response to determining that the board identified by the destined board identifier of the control message is not within the router on which the first interface board is located, transmit the control message to a router on which the board identified by the destined board identifier is located through communication connections between routers in the router cluster.

15. A router cluster, comprising:

a main router, and one or more other routers deployed as secondary router(s);

wherein each of the main router and the one or more other routers comprises:

a main control board, at least one interface board wherein a first interface board of the at least one interface boards is used to transmit control messages in the router cluster, and wherein the router cluster comprises a plurality of physically independent routers, the plurality of physically independent routers are centrally managed, the plurality of physically independent routers are operated as a single router, an interconnection interface for interconnecting with the routers in the router cluster, wherein the interconnection interface is provided on a board of the router, wherein the main router further comprises:

a processor configured to configure and enable an IP address of an interconnection interface of the main router, and acquire one or more IP addresses corresponding to the one or more interconnection interfaces of the one or more other routers, respectively, in the router cluster; and wherein each secondary router further comprises:
a processor configured to configure and enable an IP address of an interconnection interface of the secondary router, and acquire the IP address of the main router in the router cluster.

16. The router cluster according to claim 15, wherein the first interface board in each router is further configured to:
extract a destined board identifier from a control message received by the communication agent module, wherein the destined board identifier is a board identifier of a board to which the control message is to be transmitted;
determine whether the board identified by the extracted destined board identifier is the first interface board; and
in response to determining that the board identified by the extracted destined board identifier is the first interface board, transmit the control message to a processing module on the first interface board for processing.

17. The router according to claim 16, wherein the first interface board in each router is further configured to:
in response to determining that the board identified by the extracted destined board identifier is not the first interface board, determine whether the board identified by the destined board identifier of the control message is within a router on which the first interface board is located; and
in response to determining that the board identified by the destined board identifier of the control message is within a router on which the first interface board is located, transmit the control message to the board identified by the destined board identifier through an inter-board communication mechanism within the router.

18. The router according to claim 17, wherein the first interface board in each router is further configured to:
in response to determining that the board identified by the destined board identifier of the control message is not within a router on which the first interface board is located, transmit the control message to a router on which the board identified by the destined board identifier is located through communication connections between routers in the router cluster.

* * * * *